March 31, 1936.  E. C. DE WERFF  2,035,596
CLOSURE LOCK
Filed Jan. 16, 1935  2 Sheets-Sheet 1
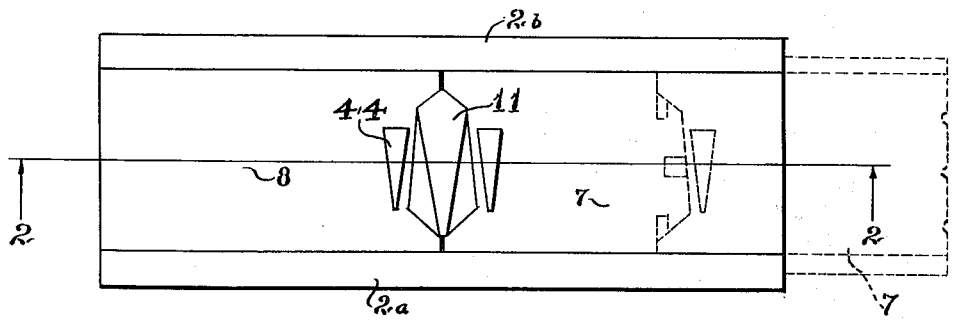
Fig. 1.
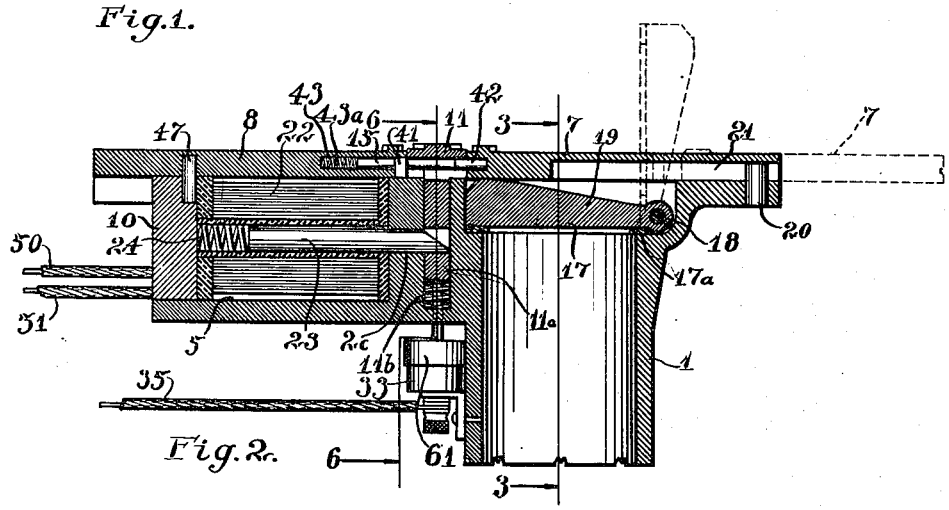
Fig. 2.
Fig. 3.
Fig. 4.
INVENTOR
Edwin C. deWerff
BY
ATTORNEY March 31, 1936.　　　E. C. DE WERFF　　　2,035,596
CLOSURE LOCK
Filed Jan. 16, 1935　　　2 Sheets-Sheet 2
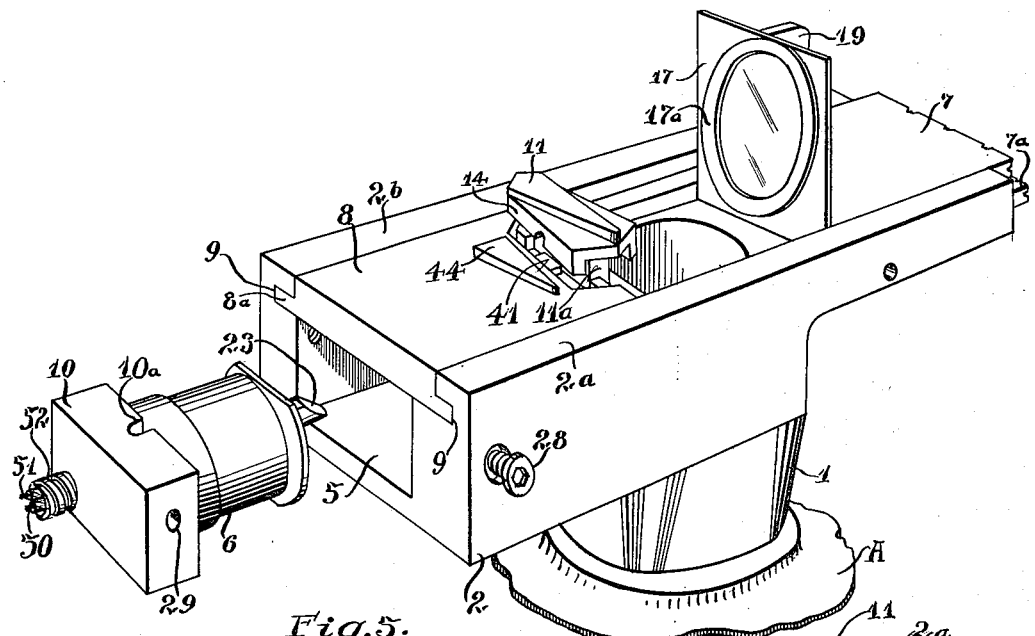
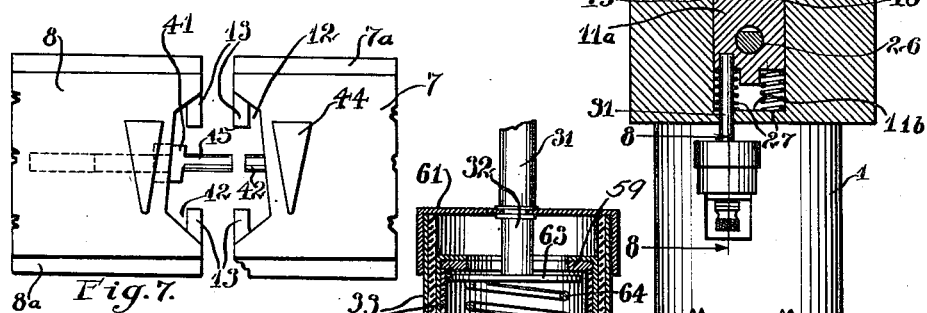
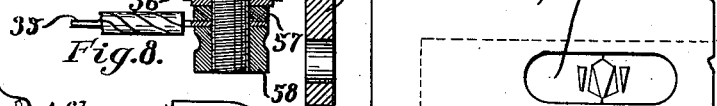
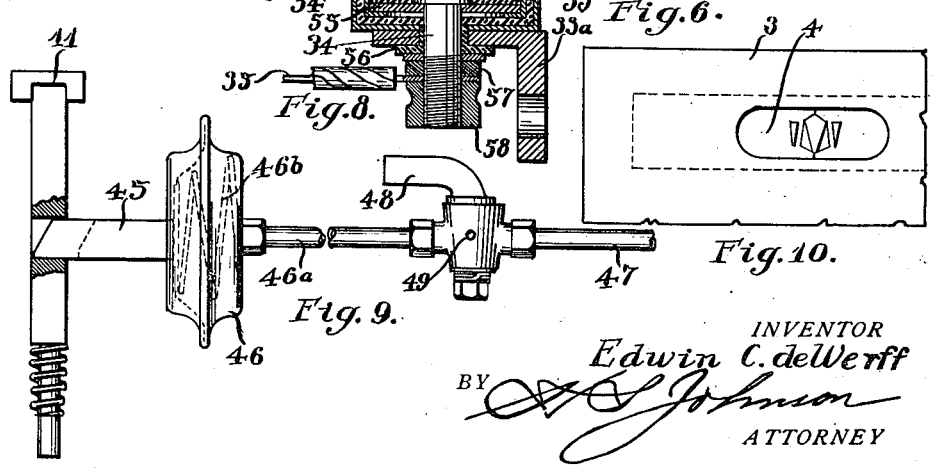
INVENTOR
Edwin C. deWerff
BY
ATTORNEY Patented Mar. 31, 1936

2,035,596

UNITED STATES PATENT OFFICE 2,035,596

CLOSURE LOCK

Edwin C. de Werff, St. Paul, Minn.

Application January 16, 1935, Serial No. 2,035

5 Claims. (Cl. 70—50)

The present invention relates to a closure lock, and more particularly to a closure lock for the gasoline tank caps of motor vehicles.

With most present caps on automobiles the gasoline tank cap is simply screwed into position and it is a simple matter for anyone desiring to steal gasoline from an automobile to simply unscrew the cap, insert a syphoning tube and draw off the entire contents of the tank. In addition to the monetary loss caused by this practice, which is unfortunately frequent, the theft usually occurs at night and when the driver returns to his car, and possibly after the gasoline stations have closed, he no more than gets started than the motor stops through lack of gas. At best this entails a walk to the nearest filling station, and, since most filling stations close at about ten o'clock at night, it has been the frequent experience of motorists who find themselves faced with the necessity of calling a tow car or the nearest open garage to come to his assistance.

Various types of locking caps for motor vehicles have been devised in the past, some of which lock with a key, others of which operate by remote control as by means of electricity. The key locking caps are open to serious objection that the key is apt to become lost, or at best necessitates either the driver getting out of the car and locking the cap himself or handing the key to the attendant with the possibility of his neglecting to return it to the driver. All of the electrical ones with which applicant is familiar are open to the serious objection that if the thief is familiar with the type of lock it is a simple matter for him to short-circuit it, thereby releasing the cap.

Various types of anti-syphon devices are available which may be inserted in the tank opening to hinder the insertion of a syphoning tube, but, since the car driver may some time want to syphon off some gas himself, it is not always desirable.

An object of my invention is to make an improved and simplified locking cap for motor vehicle gas tank caps.

A further object is to make a positive and secure locking cap which may be readily released by the driver from his seat in the automobile.

In order to attain these objects there is provided in accordance with one feature of the invention a frame element adapted to be fixedly attached to the filler neck of the gasoline tank so as to be ordinarily non-removable, or to be formed integrally therewith. In this frame is mounted a locking cover plate co-operating with a hinged closure cap for the gas tank opening and having a releasable locking element mounted to hold the closure plate and cover cap in locked, closed position. This locking element is associated with a releasing mechanism which preferably extends to a point adjacent the driver's seat so as to be releasable by the driver without leaving his position in the car.

In the present embodiment the locking device extends laterally from the filler neck of the gasoline tank and is provided with a closure plate similar in appearance and disposed oppositely to the closure plate for the tank opening, so that from a top view the device is similar on both sides so that an unauthorized person desiring to force entry to the device will not be able to distinguish which side of the device is the cover plate through which access to the filler neck is attained.

These and other features of the device will be more fully brought out in the following description and the accompanying drawings, wherein:

Figure 1 is a plan view of a device embodying the present invention.

Figure 2 is a sectional view on line 2—2 of Figure 1.

Figure 3 is a sectional view on line 3—3 of Figure 2.

Figure 4 is a schematic drawing showing an electrical circuit embodying one form of the invention.

Figure 5 is a view in perspective of the device shown in Figure 1, showing the closure plate over the filler cap in open position, the filler cap open, the locking element in raised, releasing position, and the entire magnetic locking element removed from its position in the end of the device to disclose the general structure thereof.

Figure 6 is a sectional view on line 6—6 of Figure 2.

Figure 7 is a fragmentary plan view showing the inner, or adjoining ends, of a pair of cover plates, showing the plates in partly separated position with a device for preventing the depressing of a locking element except when both cover plates are in closed, abutting position.

Figure 8 is a fragmentary sectional view on line 8—8 of Figure 6, showing an automatic switch for lighting a signal lamp when the locking mechanism is released.

Figure 9 is a view in side elevation of the elemental parts of a modified form of releasing mechanism wherein a vacuum controlled bellows is used to operate the releasing latch instead of the electro-magnetic means employed in the structure illustrated by the foregoing illustrations; and Figure 10 is a fragmentary plan view of a shield covering a gasoline tank with an opening therein showing the position the device occupies when mounted on an automobile.

Referring to the drawings in detail, an automobile gasoline tank A is provided with a filler neck 1 which is here illustrated as having formed integrally therewith the housing 2 of a locking tank closure embodying the present invention. The upper portion of the housing 2 is formed with a pair of parallel side walls 2—a and 2—b in the inner face of each of which is provided a groove 9 to slidably receive tongues 7—a and 8—a of a pair of similarly formed but oppositely disposed cover plates 7 and 8. The cover plate 7 is mounted over the filler neck opening, as best shown in Figures 2 and 5, and a recess is provided in the housing 2 at the upper end of the filler pipe in which a closure cap 17 is pivotally mounted on a pin 18. Each of the cover plates 7 and 8 are provided with a small raised boss 44 on their upper surfaces adjacent their inner ends by means of which the cover plate may be manipulated. A cam-like rib 19 is provided on the upper side of the cap 17, of a height to be engaged by the cover plate 7 in closing to force the cap 17 firmly down into sealing position.

The inner ends of the two cover plates 7 and 8 are each formed with similar but oppositely disposed indentations which complement each other when the two cover plates are in closed abutting position to closely surround a locking member 11 to be later described in detail. Extending into the indentations 12, from each side thereof, are a pair of locking lugs 13, these lugs being set downwardly from the top surface of the cover plates a distance equal to the thickness of the top portion of the locking member 11, so as to permit the locking member to lie flush with the top of the locking plates when in locking position, as shown in Figure 2.

The locking member 11 is best illustrated in Figures 2, 5, and 6, and comprises a horizontally disposed top portion with downwardly projecting side flanges 14 of a size and shape to engage the lugs 13 of the cover plates when these plates are closed and the locking device 11 is depressed to lock the cover plates in closed position. The top portion 11 of the locking device is mounted centrally on a rectangular supporting stem 11—a which is slidably mounted in a recess 11—b in the housing 2. The stem 11—a is provided with a vertically disposed slotted opening 16 at a point to receive a spring-pressed pin 15 mounted to free slidable movement in a hole 43 drilled in the inner end of the cover plate 8. A pin 42 is fixedly mounted in the inner end of the cover plate 7 in a position to engage the spring-pressed pin 15 when both cover plates are in closed, abutting position, as shown in Figure 2, to force the pin 15 into the position shown in this figure. The pin 15 has a small block 41 formed integrally therewith, and when the pin 15 is released by the opening of the cover plate 7 to the position shown in Figure 5, and in dotted lines in Figures 1 and 2, the pin 15 is moved outwardly by the spring 43—a until the block 51 engages the stem 11—a, which arrests its further movement. When in this position the block 41 lies directly under the flange 14 on the locking device 11 and prevents depressing the locking device 11 with the cover plate 7 open.

A pair of coil springs 27 are mounted in the recess 11—b below the stem 11—a to normally force the locking device upwardly to a releasing position. Fixedly secured in a hole drilled in the bottom of the stem 11—a of the recess 11—b is a signal actuating pin 31, to actuate a signal when the locking device is in releasing position. This signal mechanism will be later described in detail.

A solenoid latch mechanism 6 is mounted in a recess 5 in the left hand side of the housing 2 as it appears in Figures 2 and 5, which figures best illustrate this feature of the device. A solenoid-coil 22 has a slidably mounted core 23 and a coil spring 24 held in compression by the core to normally force the core outwardly or to the right, as illustrated in Figures 2 and 5. An opening 2—c is provided in the wall between the recesses 5 and 11—b to permit free slidable movement of the core 23 therein. An opening 26 is also provided in the stem 11—a to register with opening 2—c to receive the core 23 when the locking device 11 is in depressed, locking position, as shown in Figure 2. The upper side of the portion of the core projecting beyond the coil 22 is flattened as is also the top portion of the opening 2—c in the wall between the recesses 5 and 11—b to prevent rotation of the core. Also, the outer end of the core is beveled to form a cam which forces the core back against the force of the spring 24 upon depressing the locking device 11 from an upward or released position, as shown in Figure 5, to a downward or locking position, as shown in Figure 2.

The solenoid 6 is fixedly supported upon a block 10 which is closely fitted into the end of the recess 5. The block 10 is provided with a depression 10—a in its inner face which is adapted to receive a pin 47 fixedly secured in a hole in the lower side of the cover 8 to securely hold the cover 8 in a closed position when the block 10 is in position, as shown in Figure 2. The block 10 is secured in position by a pair of fillister head screws 28 which are positioned to enter depressions 29 on opposite sides of the block 10. After the block 10 is thus secured in position the fillister heads of the screws may be filled by driving a lead pellet into them in a well known manner so as to prevent their removal by means of ordinary tools.

A pair of lead wires 50 and 51 are connected to the terminals of the coil 22 and are preferably enclosed in an armored housing 52 to resist any effort to cut these wires.

Referring to the signal switch best shown in Figures 2, 6, and 8, a switch housing 33 is supported on a bracket 33—a fixedly secured to the side of the filler neck 1. Within the housing 33 is mounted a cup-shaped insulating member 53. Inside the insulating member 53 is fitted a cylindrical conducting member 54 with inwardly projecting contact flanges at the top and bottom, respectively, thereof. A centrally perforated disk 55 is mounted within the cylindrical conducting member 54 to rest upon and have electrical contact with the lower flange of the member 54, and a bolt 34 passes through the central perforation in the disk 55, through an insulating flanged bushing 56 mounted in an opening in the bracket 33—a and is provided with a nut 57 which securely holds the parts in assembled position. A terminal nut 58 is also threadedly mounted on the bolt 34 to secure a conductor 35 thereto. A washer 59, of conductive material, is mounted below the top flange of the member 54 and in electrical contact therewith and is held in supported position by a cup-shaped insulating member 60 mounted interiorly of the member 54. An inverted cup-shaped member 61 is mounted to telescope freely over the upper end of the housing 33 and is provided with a depending center post 62 to the lower end of which is fixedly connected a disk 63 of conductive material. A coil spring 64 is mounted in the lower portion of the housing to normally force the disk 63 into electrical contact with the washer 59.

A circuit adapted for use with the present construction is shown in Figure 4. In this figure one side of an automatic battery 36 is grounded as at 65, as is also one terminal of the solenoid coil as at 66 and one side of the signal switch 33, in the present construction this being the housing 33. From the other terminal of the battery 36 a conductor 67 is connected to a signal lamp 30, which may be mounted in any convenient position in the automobile, as on the instrument panel, not illustrated. From the other side of the lamp 30 a conductor 35 is connected to the other side of the signal switch 33, in this case to the terminal post 34. A conductor 69 is connected to the conductor 67, and to one side of an ordinary push button 38. From the other side of the push button a conductor 70 is connected to one side of a locking switch 37 which is preferably the ignition switch of the automobile in which the device is installed. From the other side of the switch 37 a conductor 51 is connected to the other terminal of the solenoid coil 22.

Ordinarily a plate 3 covers the automobile gasoline tank (see Figure 10), and the housing 2 is positioned below the plate 3, an opening 4 being provided in the plate 3 to expose the opening to the gasoline tank.

The operation of the device is as follows: Assuming that the driver of the automobile in which the device is installed drives into a filling station for some gasoline, the ignition switch 37 being closed, he presses the push button 38, thereby closing a circuit from ground 65, through the battery 36, through conductors 67 and 69, through the push button 38, conductor 70, through the ignition switch 37, conductor 51, and the coil 22 of the solenoid 6, to ground 66. This actuates the solenoid and draws the core 23 inwardly to the dotted line position shown in Figure 4, freeing the locking member 11 for upward movement. Thereupon the springs 27 force the locking member 11 upward to the releasing position shown in Figure 5. This frees the cover plate 7 for slidable opening movement and the spring-pressed pin 15 moves outwardly until the block 41 carried by the pin 15 is in exposed position beneath the flange 14 on the locking member 11, thereby preventing depressing of the locking member 11 until the cover plate 7 is again closed, as previously described. The pin 15 riding in the slotted opening 16 of the stem 11—a limits the upward movement of the locking member. As the locking member 11 moves upwardly to a releasing position, carrying with it the pin 31 mounted in the bottom thereof, the pin 31 frees the cup 61 of the signal switch 33 for upward movement, whereupon the spring 64 forces the disk 63 into electrical contact with the washer 59, thereby closing a circuit from ground 65, through conductor 67, lamp 30, conductor 35, and switch 33 to ground 33—a. This illuminates the signal lamp and indicates to the driver that the locking device is in releasing position and he may then release the push button 38. The filling station attendant then slides the cover plate 7 outwardly to a fully open position, the movement of the cover plate 7 being limited by a pin 20 mounted in a hole drilled in the housing 1, which pin lies in a longitudinally disposed groove 21 in the lower central side of the cover plate 7. When the cover plate 7 is in fully open position, as shown in Figure 5, and indicated in dotted lines in Figures 1 and 2, the hinged cap 17 is raised to expose the filler neck opening by means of spring hinge 18. After filling the tank, the attendant closes the hinged cap 17, slides the cover plate 7 to a closed position, thereby forcing the pin 15 and block 41 inwardly to free the locking member 11 for downward movement. He then depresses the locking member 11 to force the core 23 inwardly against the force of the spring 24 until the core 23 registers with the opening 26 in the stem 11—a, whereupon the core is forced into this opening by the spring 24, thereby securing the locking member in depressed, locking position. As the locking member is moved to its depressed locking position, the pin 31 engages the cup 61 and moves it downward to move the disk 63 out of contact with the washer 59, thereby opening the signal circuit and extinguishing the signal lamp 30 and indicating to the driver that the closure is locked. The cork gasket 17—a is cemented to the lower side of the plate 17, as shown in Figure 5, thus preventing the out-splashing of gasoline.

A modified form of releasing device is shown in Figure 9. In this modified form a collapsible bellows 46 is substituted for the solenoid 6 and a locking bolt 45 for the core 23, the locking bolt being secured to the movable face of the bellows 46. A tube 46—a is in open communication with the interior of the bellows and with a valve 48 of a well known type having an air bleed opening 49 in a side thereof. A second tube 47 is in open communication with the valve 48 and with an area of reduced pressure, such as the intake manifold, not shown, of the automobile upon which the device is mounted. In one position of the valve the air bleed is closed, and open communication is established between the interior of the bellows 46 and the intake manifold, while in the other position of the valve communication with the intake manifold is closed and air at atmospheric pressure is admitted to the bellows through the bleed hole 49. Upon the entrance of air at atmospheric pressure into the bellows a spring 46—b tends to force the movable face of the bellows outwardly to move the locking bolt to a locking position. Other than this the operation of the modified form shown in Figure 9 is the same as that illustrated and described for the electrically operated device.

The present locking closure is simple and positive in operation, readily operated by the driver from his driving position in the automobile, and provided with signal means to indicate to him at all times the condition of the lock. It is neat and attractive in appearance, and is extremely difficult to open except in the prescribed manner.

It is apparent that neither the electrically actuated device nor the vacuum operated device can be operated when the automobile motor is stopped, since the electrically operated device depends for a closure of the ignition switch to complete the unlocking circuit and the vacuum operated type depends upon reduced pressure in the intake manifold for operation, which, of course, is only present when the automobile motor is running.

I claim:

1. In combination with a fuel tank having a filling opening, a housing supported above said opening, a slidable plate within said housing for said opening, a slidable locking element normally interlocking with said plate, a slidable pin positioned to interlock with said interlocking element when in locking engagement with said plate, and means for withdrawing said pin from interlocking engagement with said locking element.

2. In combination with a fuel tank having a filling opening, a slidable cover plate arranged in connection with said opening, a slidable locking element interlocking with said plate when in closed position, a slidable pin positioned to interlock with said locking element, means for withdrawing said pin from locking engagement with said element, and spring means releasing said element from said plate when said pin is withdrawn.

3. In combination with a fuel tank having a filling opening, a slidable cover plate arranged in connection with said opening, a slidable locking element interlocking with said plate when in closed position, a slidable pin positioned to interlock with said locking element, means for withdrawing said pin from locking engagement with said element, spring means releasing said element from said plate when said pin is withdrawn, a spring pressed pin interlocking with said element when said element is in locking engagement with said plate, and means carried by said plate to carry said pin out of such locking engagement when said plate is closed.

4. In combination with a fuel tank having a filling opening, a hinged cover for said opening, a slidable cover plate positioned above said cover and normally holding said cover in closed position, a locking element interlocking with said plate when in closed position, an element interlocking with said locking element to hold the same in locking engagement with said plate, and means for withdrawing said last-mentioned element from engagement with said locking element.

5. In combination with a fuel tank having a filler opening, a slidable plate mounted over said opening, a movable locking element interlocking with said plate when in closed position, a slidable pin interlocking with said element when the same is in interlocking position with said plate, and electro magnetic means for withdrawing said pin from engagement with said element.

EDWIN C. DE WERFF.